(12) United States Patent
Miyamoto et al.

(10) Patent No.: US 11,706,362 B2
(45) Date of Patent: Jul. 18, 2023

(54) IMAGE FORMATION SYSTEM CAPABLE OF STARTING EXECUTION OF CALIBRATION WITH TIMING TO START INSERTION OF INTERLEAVING PAPER

(71) Applicant: KYOCERA Document Solutions Inc., Osaka (JP)

(72) Inventors: Kenji Miyamoto, Osaka (JP); Takahiro Honda, Osaka (JP); Hideo Tanii, Osaka (JP); Makoto Matsumoto, Osaka (JP); Tatsuya Majima, Osaka (JP); Takuya Aritsuki, Osaka (JP); Hiroyuki Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/967,963

(22) Filed: Oct. 18, 2022

(65) Prior Publication Data
US 2023/0131739 A1  Apr. 27, 2023

(30) Foreign Application Priority Data
Oct. 27, 2021 (JP) ................................ 2021-175850

(51) Int. Cl.
*G06F 3/12* (2006.01)
*H04N 1/23* (2006.01)
*H04N 1/60* (2006.01)
*H04N 1/00* (2006.01)

(52) U.S. Cl.
CPC ....... *H04N 1/00649* (2013.01); *G06F 3/1208* (2013.01); *G06F 3/1258* (2013.01); *H04N 1/00037* (2013.01); *H04N 1/00087* (2013.01); *H04N 1/2323* (2013.01); *H04N 1/6094* (2013.01)

(58) Field of Classification Search
CPC .......... H04N 1/00649; H04N 1/00037; H04N 1/00087; H04N 1/2323; H04N 1/6094; G06F 3/1208; G06F 3/1258
See application file for complete search history.

(56) References Cited

U.S. PATENT DOCUMENTS

2018/0348688 A1\* 12/2018 Yumoto ............. G03G 15/2064
2020/0234090 A1\* 7/2020 Hashimoto .......... G06K 15/027

FOREIGN PATENT DOCUMENTS

JP         2005106921 A      4/2005

\* cited by examiner

*Primary Examiner* — Moustapha Diaby
(74) *Attorney, Agent, or Firm* — IP Business Solutions, LLC

(57) ABSTRACT

An image formation system includes an image forming apparatus and an inserter. The image forming apparatus includes an image forming device, a conveyance device, and a control device. The control device functions as a controller and an executor. The controller allows the inserter to insert an interleaving paper between sheets of printed material at an insertion start timing specified by a print job. When the plurality of calibrations include a second calibration capable of being completed within an interleaving paper insertion time required to insert the interleaving paper or a third calibration capable of being completed within a total time of the interleaving paper insertion time and a predetermined additional time, the executor executes the second calibration or the third calibration in time with the insertion start timing.

6 Claims, 11 Drawing Sheets

Fig.3

| TYPE OF CALIBRATION FUNCTION | EXECUTION TIME | COUNT VALUE | |
|---|---|---|---|
| | | ELAPSED TIME | NUMBER OF PRINTED SHEETS |
| CONTROL OF IMAGE DENSITY OF PRINTED MATERIAL | L1 | CT1 | CP1 |
| CONTROL OF IMAGE COLOR SHADE OF PRINTED MATERIAL | L2 | CT2 | CP2 |
| CONTROL OF COLOR LOCATION OF PRINTED MATERIAL | L3 | CT3 | CP3 |

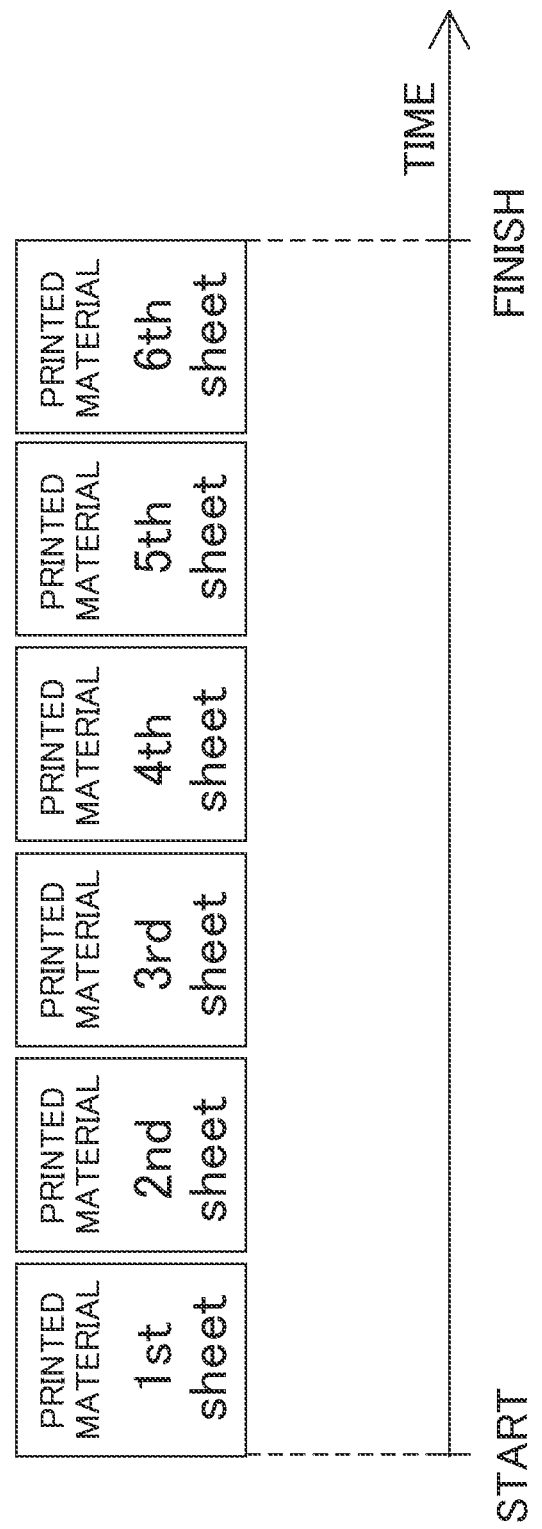

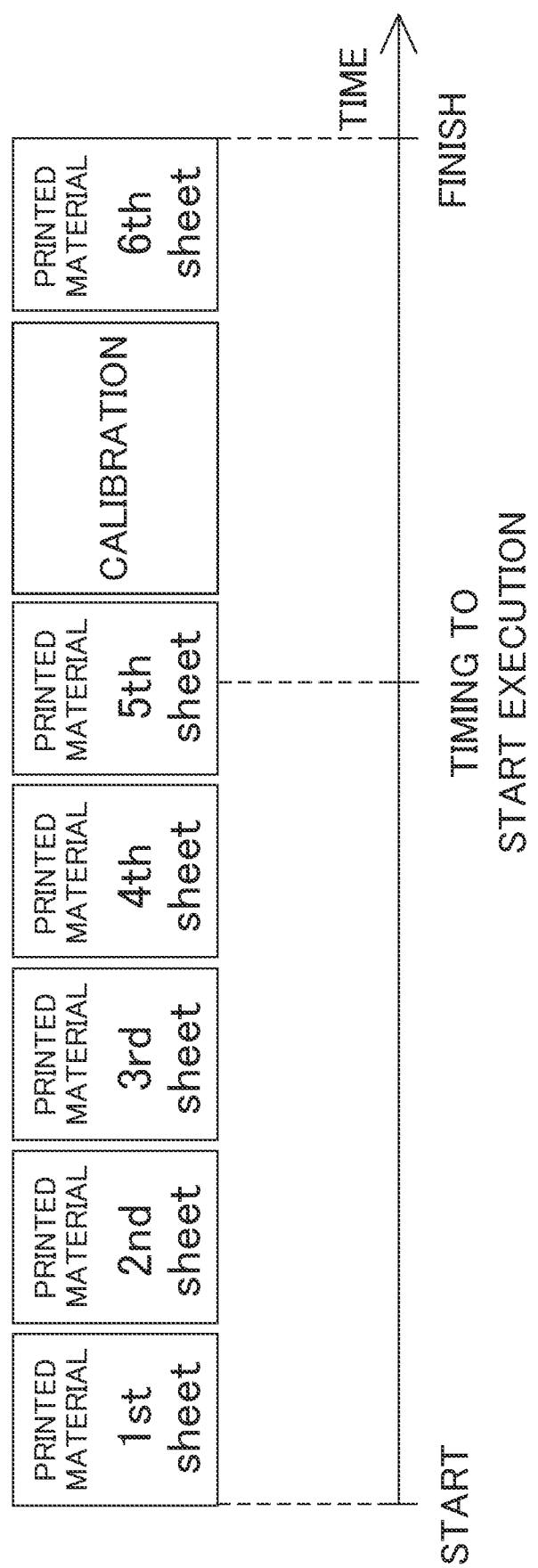

IMAGE FORMATION SYSTEM CAPABLE OF STARTING EXECUTION OF CALIBRATION WITH TIMING TO START INSERTION OF INTERLEAVING PAPER

INCORPORATION BY REFERENCE

This application claims priority to Japanese Patent Application No. 2021-175850 filed on 27 Oct. 2021, the entire contents of which are incorporated by reference herein.

BACKGROUND

The present disclosure relates to image formation systems including an inserter capable of inserting an interleaving paper between sheets of printed material.

There are generally known image forming apparatuses, such as a printer or a multifunction peripheral, having a calibration function for the purpose of retaining and controlling the image quality of printed material. For example, when in such an image forming apparatus a predetermined elapsed time has passed since a previous calibration or the number of printed sheets reaches a predetermined value, the image forming apparatus determines that the timing to start the execution of a calibration has come and executes the calibration.

SUMMARY

A technique improved over the aforementioned technique is proposed as one aspect of the present disclosure.

An image formation system according to an aspect of the present disclosure includes an image forming apparatus and an inserter. The image forming apparatus includes: an image forming device that forms an image on a printing sheet to create printed material; and a conveyance device that conveys the printing sheet. The inserter inserts an interleaving paper between sheets of the printed material in a manner to supply the interleaving paper downstream of the image forming device in a direction of conveyance of the printing sheet. The image forming apparatus further includes a control device. The control device includes a processor and functions, through the processor executing a control program, as a controller, an executor, and a counter. The controller performs control for allowing the image forming device to execute a print job and allowing the inserter to insert the interleaving paper between the sheets of the printed material at an insertion start timing specified by the print job. The executor executes each individual one of a plurality of calibrations for purpose of retaining and controlling an image quality of the printed material. The counter counts, for each of the plurality of calibrations, a count value of a predetermined item. When the plurality of calibrations include a first calibration in which the count value has reached a predetermined target value, the executor determines that a timing to start execution of the first calibration has come and executes the first calibration. When the plurality of calibrations include a second calibration capable of being completed within an interleaving paper insertion time required to insert the interleaving paper or a third calibration capable of being completed within a total time of the interleaving paper insertion time and a predetermined additional time, the executor executes the second calibration or the third calibration in time with the insertion start timing.

BRIEF DESCRIPTION OF THE DRAWINGS

FIG. 3 shows an example of a data structure of a calibration function management table.

FIG. 9A is a diagram showing an example of processing in a general image forming apparatus when a print job is normally executed.

FIG. 9B is a diagram showing an example of processing in the general image forming apparatus when the timing to start execution of a calibration has come during processing for creating printed material.

DETAILED DESCRIPTION

Figure 1:
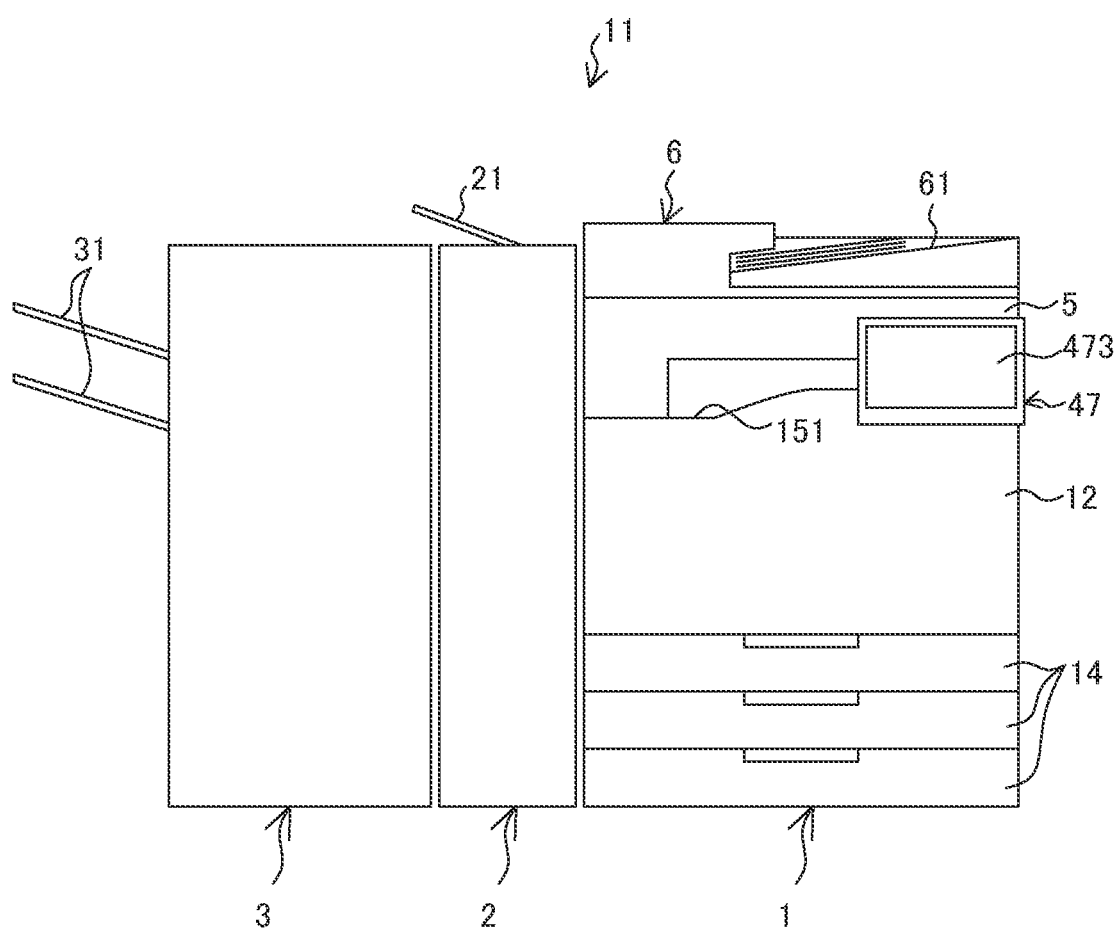
FIG. 1 is a front view schematically showing the appearance of an image formation system according to an embodiment of the present disclosure.

Hereinafter, a description will be given of an image formation system according to one embodiment of the present disclosure with reference to the drawings. FIG. 1 is a front view schematically showing the appearance of an image formation system 11 according to the one embodiment of the present disclosure. The image formation system 11 includes an image forming apparatus 1, an inserter 2, and a post-processing apparatus 3. The inserter 2 is joined to the image forming apparatus 1. The post-processing apparatus 3 is joined to the inserter 2.

The image forming apparatus 1 is a multifunction peripheral combining a plurality of functions, such as, for example, a copy function, a print function, a scan function, and a facsimile function. The inserter 2 is an inserter that inserts one or more interleaving papers between sheets of printed material output by the image forming apparatus 1. The post-processing apparatus 3 is a finisher that subjects sheets (sheets of printed material or interleaving papers) output by the inserter 2 to post-processing (for example, stapling or punching).

Each of the image forming apparatus 1, the inserter 2, and the post-processing apparatus 3 includes a control device and a communication port. The image forming apparatus 1 and the inserter 2 are communicable through the respective communication ports provided therein. The inserter 2 and the post-processing apparatus 3 are communicable through the respective communication ports provided therein. Thus, the image forming apparatus 1 can control the inserter 2. Furthermore, the image forming apparatus 1 can control the post-processing apparatus 3 through the inserter 2.

The image forming apparatus 1 includes a document feed device 6, a document reading device 5, an image forming device 12, a sheet feed device 14, and an operation device 47.

The document feed device 6 is mounted by hinges or the like on the top of the document reading device 5 and is thus capable of being opened and closed with respect to the document reading device 5. The document feed device 6 functions as a document holding cover in reading an original document sheet placed on a platen glass. The document feed device 6 is an automatic document feed device called an ADF (auto document feeder). The document feed device 6 includes a document loading tray 61 and feeds original document sheets loaded onto the document loading tray 61 to the document reading device 5 sheet by sheet.

First, a description will be given of the case where a document reading operation is performed on the image forming apparatus 1. The document reading device 5 optically reads an image of an original document sheet fed to the document reading device 5 by the document feed device 6 or an image of an original document sheet placed on the platen glass and generates image data on the original document sheet. The image data generated by the document reading device 5 is saved in an image memory or the like.

Next, a description will be given of the case where an image forming operation is performed on the image forming apparatus 1. Based on image data generated by the document reading operation or print data received from a computer (for example, a PC (personal computer)) as an external device connected via a network, the image forming device 12 forms a toner image on a printing sheet as a recording medium being fed from the sheet feed device 14, thus creating printed material.

The image forming device 12 includes, for example, respective charging devices for different colors, respective exposure devices for the different colors, respective developing devices for the different colors, respective primary transfer devices for the different colors, an intermediate transfer belt, and a secondary transfer roller. The image forming device 12 transfers a multi-color toner image formed by the above components onto a printing sheet. The sheet (printed material sheet) bearing the toner image formed by the image forming device 12 is subjected to fixation processing and is then discharged onto an output tray 151 or discharged through the left side wall of the apparatus body toward the inserter 2.

The operation device 47 accepts user's instructions for various types of operations and processing executable by the image forming apparatus 1, such as, for example, an instruction to execute an image forming operation. The operation device 47 includes a display device 473 that displays operation guidance and other types of information for the user. The operation device 47 accepts, through a touch panel provided on the display device 473, the input of a user's instruction based on a user's gesture (for example, a touch gesture) on an operation screen being displayed on the display device 473 or accepts the input of a user's instruction based on a user's operation on a physical key.

The display device 473 is formed of an LCD (liquid crystal display) or the like. The display device 473 is equipped with a touch panel. When the user makes a touch gesture on a button or key being displayed on the screen, the touch panel accepts an instruction associated with a point where the touch gesture has been made.

The inserter 2 includes: a relay conveyance path along which a printed material sheet output by the image forming apparatus 1 is to be conveyed to the post-processing apparatus 3; an inserter tray 21 onto which interleaving papers are to be loaded; an insertion conveyance path along which an interleaving paper taken in from the inserter tray 21 is to be conveyed to the relay conveyance path; an intake mechanism that takes in an interleaving paper from the inserter tray 21; and a conveyance roller pair capable of conveying a printed material sheet or an interleaving paper. The inserter 2 inserts one or more interleaving papers between sheets of printed material output and coming from the image forming apparatus 1 by sandwiching the one or more interleaving papers between the sheets of the printed material in a manner to supply the interleaving papers downstream of the image forming device 12 of the image forming apparatus 1 in a direction of conveyance of printing sheets.

The relay conveyance path is provided with a sensor that detects a printed material sheet or an interleaving paper passing through the relay conveyance path. The insertion conveyance path is provided with a sensor that detects an interleaving paper passing through the insertion conveyance path.

The post-processing apparatus 3 includes: a stapling device that staples sheets (printed material sheets or interleaving papers) output from the inserter 2; and a punching device that punches sheets output from the inserter 2. The body of the post-processing apparatus 3 is provided at the left side surface with sheet output trays 31 on which sheets subjected to the post-processing and discharged from the post-processing apparatus 3 are to be placed. Some printed material sheets or interleaving papers may be discharged, as they are, to the sheet output trays 31 without undergoing the post-processing.

Figure 2:
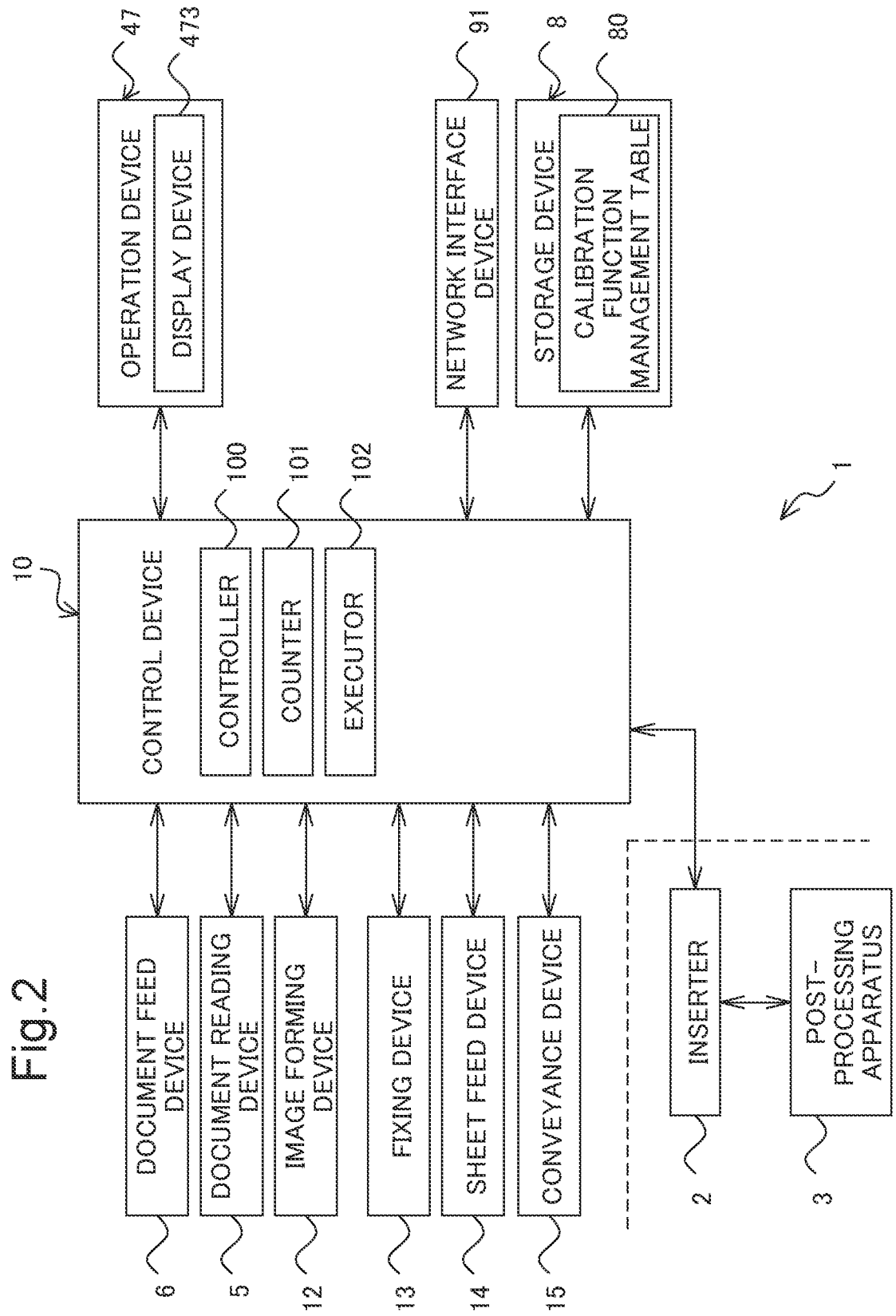
FIG. 2 is a functional block diagram showing an essential internal configuration of an image forming apparatus according to a first embodiment.

FIG. 2 is a functional block diagram showing an essential internal configuration of the image forming apparatus 1 according to the first embodiment. The image forming apparatus 1 includes a control device 10, the document feed device 6, the document reading device 5, the image forming device 12, a fixing device 13, the sheet feed device 14, a conveyance device 15, the operation device 47, a network interface device 91, and a storage device 8.

The image forming apparatus 1 has a plurality of calibration functions for purpose of retaining and controlling the image quality of printed material. The image forming apparatus 1 can perform a plurality of calibrations individually. The image forming apparatus 1 performs, as the plurality of calibrations, each individual one of a density calibration for controlling the image density of the printed material, a color shade calibration for controlling the color shade of the image of the printed material, and a location calibration for controlling the color location of the printed material.

The image forming apparatus 1 has a structure capable of being connected to the inserter 2. The image forming apparatus 1 has a structure capable of being connected through the inserter 2 to the post-processing apparatus 3. The same components as those in the image forming apparatus 1 shown in FIG. 1 are designated by the same references and detailed description thereof will be omitted.

The fixing device 13 applies heat and pressure to the sheet bearing the toner image formed by the image forming device 12, thus fixing the toner image on the sheet. The sheet subjected to the fixation processing is discharged onto the output tray 151 or discharged through the left side wall of the apparatus body toward the inserter 2.

The conveyance device 15 includes a conveyance roller pair, a discharge roller pair, other rollers, and a conveyance motor connected to the conveyance roller pair, the discharge roller pair, and the other rollers. The controller 10 drives the conveyance motor to rotate the conveyance roller pair, the discharge roller pair, and the other rollers, thus allowing a sheet fed by the sheet feed device 14 to be conveyed along the conveyance path.

The network interface device 91 is a communication interface that performs sending and receiving of various types of data to and from external devices (for example, a PC) in a local area or on the Internet.

The storage device 8 is a large storage device, such as an HDD (hard disk drive) or an SSD (solid state drive). The storage device 8 stores various types of control programs and a calibration function management table 80. FIG. 3 shows an example of a data structure of the calibration function management table 80. Data registered on the calibration function management table 80 contain different types of calibration functions that the image forming apparatus 1 has, respective execution times L1, L2, and L3 required to execute the different types of calibration functions, and count values (respective elapsed times CT1, CT2, and CT3 and respective numbers of printed sheets CP1, CP2, and CP3) after the respective previous executions of the different types of calibration functions.

The control device 10 includes a processor, a RAM (random access memory), a ROM (read only memory), and a dedicated hardware circuit. The processor is, for example, a CPU (central processing unit), an ASIC (application specific integrated circuit) or an MPU (micro processing unit).

When the processor of the control device 10 operates in accordance with a control program stored in the storage device 8, the control device 10 functions as a controller 100, a counter 101, and an executor 102. However, each of the controller 100 and the other components may not be based on the operation of the control device 10 in accordance with the control program, but may be constituted by a hardware circuit. Hereinafter, the same applies to other embodiments unless otherwise stated.

The controller 100 governs the overall operation control of the image forming apparatus 1. The controller 100 is connected to the document feed device 6, the document reading device 5, the image forming device 12, the fixing device 13, the sheet feed device 14, the conveyance device 15, the operation device 47, the network interface device 91, the storage device 8, the inserter 2, and the post-processing apparatus 3 and controls the operations and so on of these components and apparatuses. For example, based on a print job received from a PC as an external device, the controller 100 controls the image forming device 12 to allow the image forming device 12 to execute the print job, form an image on a printing sheet, and thus create printed material.

When the print job contains insertion processing for inserting a necessary number of interleaving papers, the controller 100 controls the inserter 2 to allow the inserter 2 to supply and insert the interleaving papers between sheets of the printed material at an insertion start timing specified by the print job. In accordance with the instruction of the controller 100, the inserter 2 supplies and inserts the interleaving papers between the sheets of the printed material.

The counter 101 counts, for each of the plurality of calibrations, the count value of each of predetermined items (for example, the elapsed time or the number of printed sheets) for purpose of determining whether the time to execute the next calibration has come, and uses the counted value to update the count value on the calibration function management table 80.

The executor 102 executes each individual one of the plurality of calibrations for purpose of retaining and controlling the image quality of printed material. The executor 102 allows the image forming device 12 to execute each calibration at a predetermined timing to start the execution of the calibration. When the count value counted by the counter 101 reaches a predetermined target value, the executor 102 determines that the timing to start the execution of the calibration has come and executes the calibration. For example, when determining, based on the count value stored on the calibration function management table 80, that a predetermined elapsed time has passed since the previous calibration or that the number of printed sheets after the previous calibration has reached a predetermined number of printed sheets, the executor 102 determines that the timing to start the execution of the calibration has come and executes the calibration.

In addition, when the plurality of calibrations include a calibration capable of being completed within an interleaving paper insertion time required to insert a necessary number of interleaving papers, the executor 102 starts the execution of the calibration at the insertion start timing for the inserter 2 to start the supply and insertion of the interleaving papers between sheets of printed material (in time with the insertion start timing).

Figure 4:
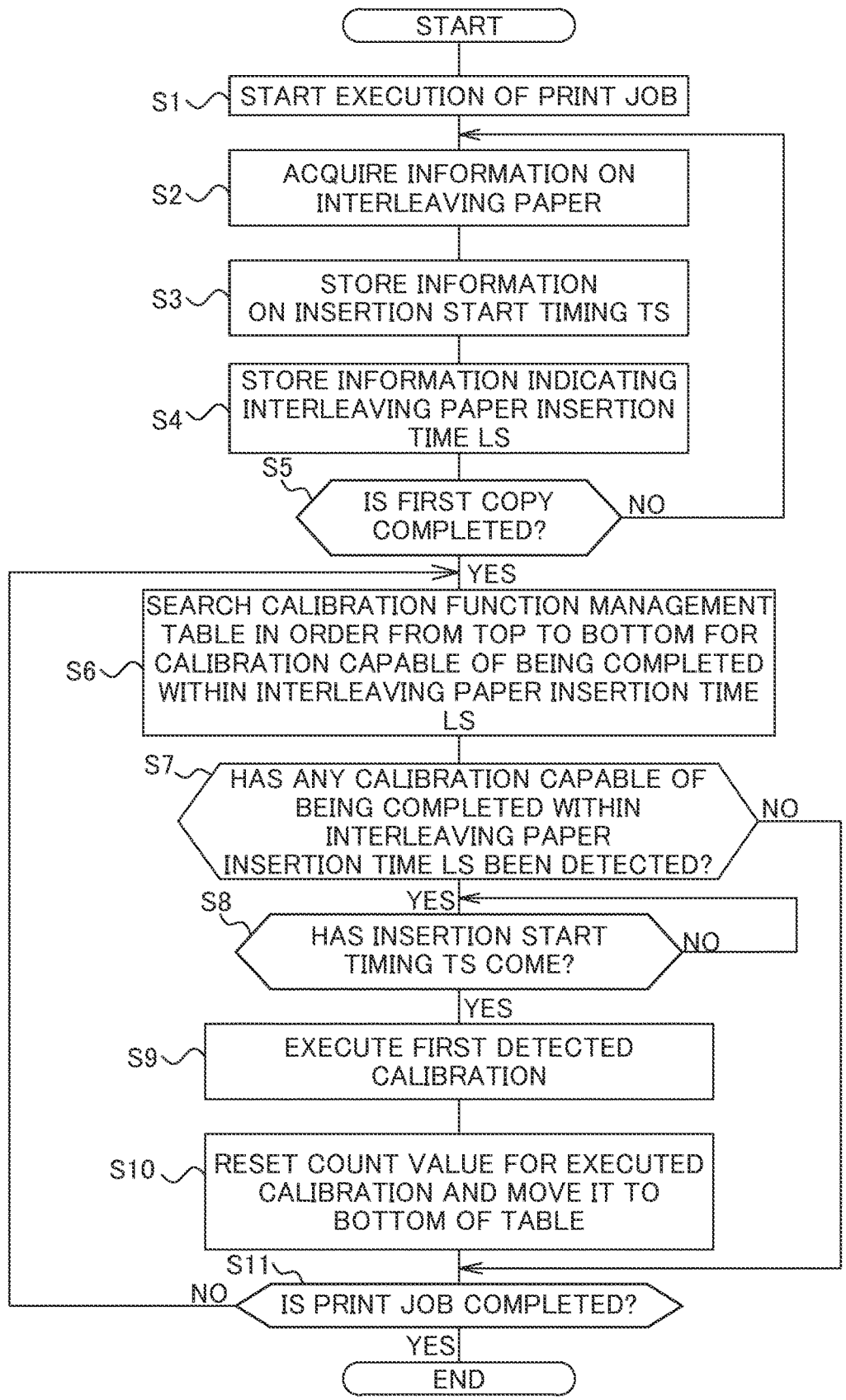
FIG. 4 is a flowchart showing an example of calibration execution processing.

Next, a description will be given of an example of calibration execution processing performed by the control device 10 of the image forming apparatus 1, with reference to the flowchart shown in FIG. 4 and so on. The calibration execution processing is performed in executing a print job instructing to make a plurality of copies of printed material.

The controller 100 controls the image forming device 12 and so on to start the execution of a print job (step S1). While the image forming device 12 creates a first copy of printed material, the controller 100 acquires, from information indicated by the print job, information on interleaving papers (specifically, information on the insertion start timing TS (for example, after what number of sheets of printed material an interleaving paper should be inserted) and information on a necessary number of interleaving papers to be inserted in a single round of insertion processing) (step S2).

Figure 5:
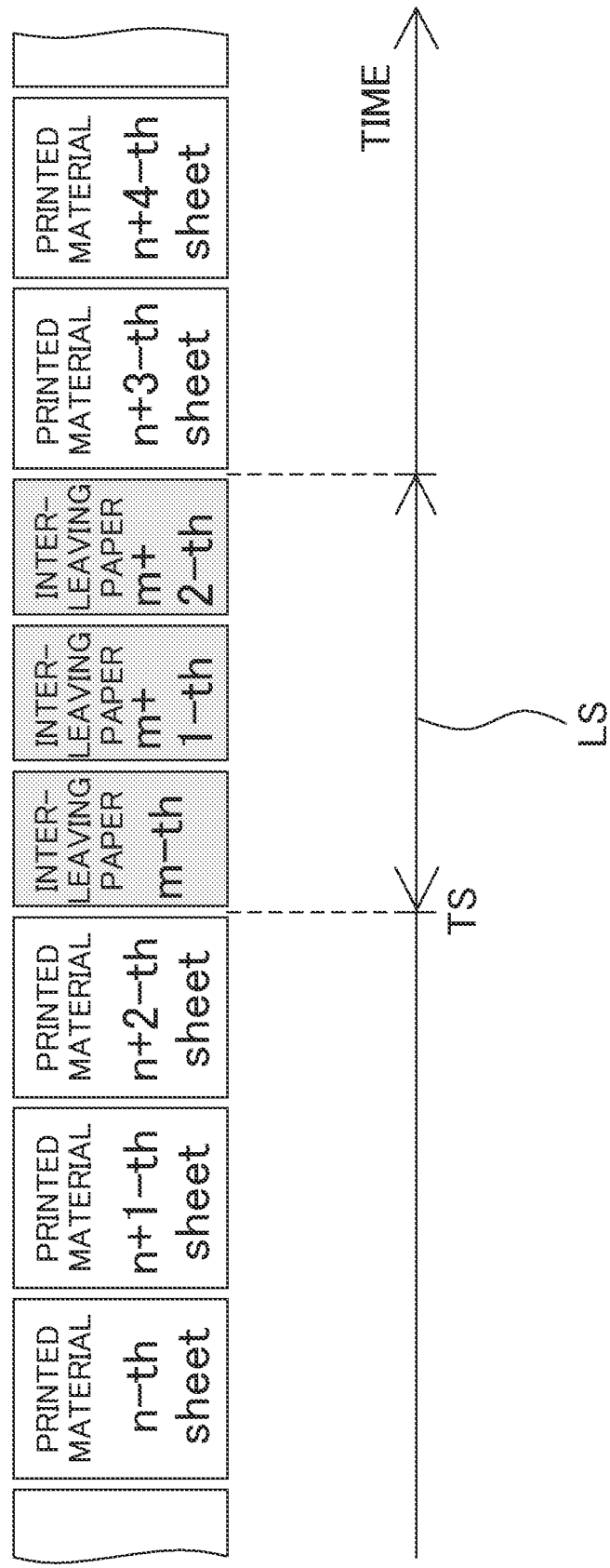
FIG. 5 is a diagram for illustrating an interleaving paper insertion time.

The controller 100 allows the acquired information on the insertion start timing TS to be stored, for example, in the RAM (step S3). The controller 100 calculates, based on the information on a necessary number of interleaving papers to be inserted, the interleaving paper insertion time LS required to insert the necessary number of interleaving papers and saves information indicating the calculated interleaving paper insertion time LS (step S4). For example, when the time required for the inserter 2 to insert a single interleaving paper is five seconds, the controller 100 calculates the interleaving paper insertion time LS required to insert three interleaving papers to be 15 seconds (=5 seconds×3). FIG. 5 is a diagram for illustrating the interleaving paper insertion time LS.

Subsequently, the controller 100 determines whether or not the creation of a first copy of printed material in the print job being executed has finished (step S5). When the controller 100 determines that the creation of a first copy of printed material has finished (YES in step S5), the executor 102 searches the calibration function management table 80 in the order from top to bottom based on the information stored in step S4 to detect a calibration capable of being completed within the interleaving paper insertion time LS (step S6). In short, the executor 102 retrieves a calibration having an execution time equal to or shorter than the interleaving paper insertion time LS from among the calibrations stored in the calibration function management table 80. On the other hand, when determining that the creation of a first copy of printed material has not yet finished (NO in step S5), the controller 100 goes back to the processing in step S2.

The executor 102 determines whether or not any calibration having an execution time equal to or shorter than the interleaving paper insertion time LS has been detected by the above search (step S7). When determining that any calibration having an execution time equal to or shorter than the interleaving paper insertion time LS has been detected (YES in step S7), the executor 102 determines, based on the information stored in step S3, whether or not the insertion start timing TS to start the insertion of a necessary number of interleaving papers has come (step S8). On the other hand, when determining that no calibration having an execution time equal to or shorter than the interleaving paper insertion time LS has been detected (NO in step S7), the executor 102 goes to the processing in step S11.

When determining in step S8 that the insertion start timing TS has come, i.e., the current time is the insertion start timing TS (YES in step S8), the executor 102 allows the image forming device 12 to execute a calibration first detected in the above search (step S9). In other words, the executor 102 allows the image forming device 12 to execute the calibration in parallel with the insertion of a necessary number of interleaving papers.

Figure 6:
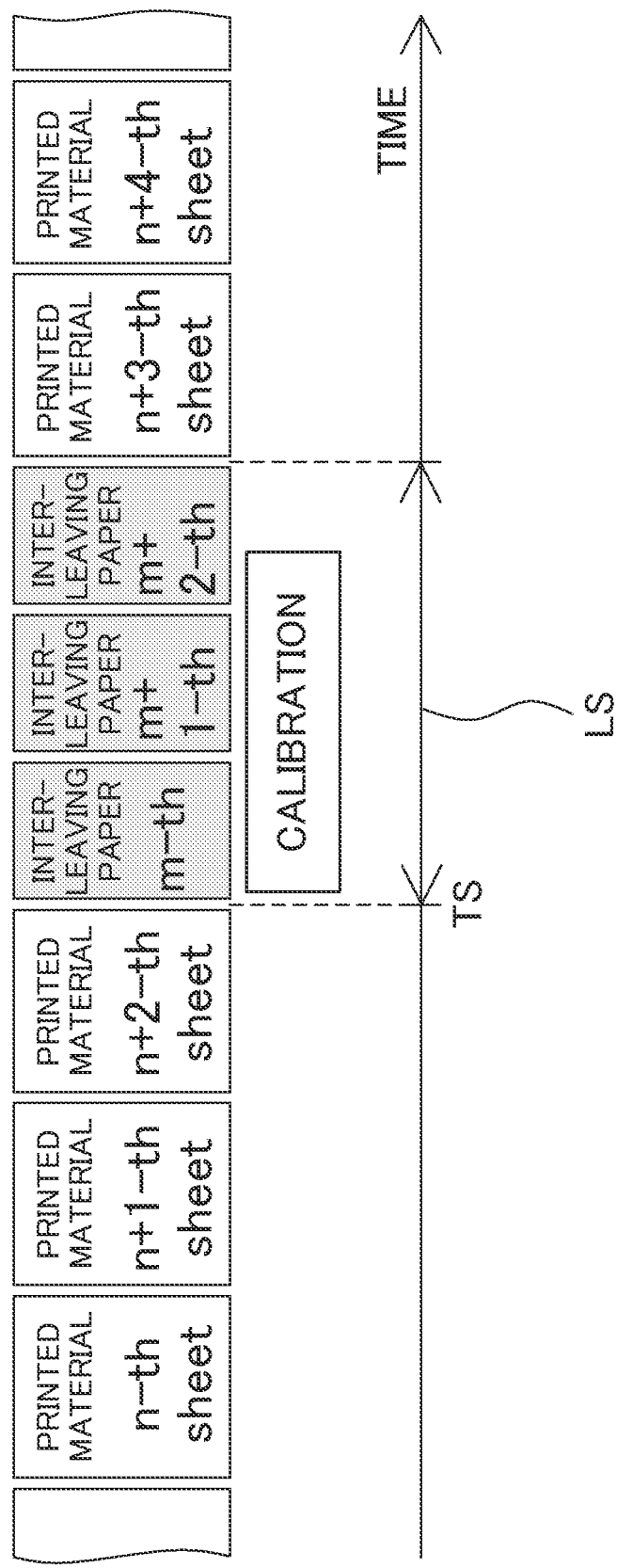
FIG. 6 is a diagram showing an example of processing where a calibration is executed in parallel with the insertion of interleaving papers.

FIG. 6 is a diagram showing an example of processing where a calibration is executed in parallel with the insertion of interleaving papers. As shown in FIG. 6, the image forming device 12 finishes a calibration within the time for insertion of three interleaving papers.

Subsequently, the executor 102 resets the count values for the executed calibration stored on the calibration function management table 80 and moves all pieces of information stored about the executed calibration to the bottom of the calibration function management table 80 (step S10). Thus, the opportunity for each calibration to be executed is equalized. After the processing in step S10, the executor 102 goes to the processing in step S11.

The controller 100 determines whether or not the print job is completed (step S11). When determining that the print job is completed (YES in step S11), the controller 100 ends the calibration execution processing. On the other hand, when determining that the print job is not completed (NO in step S11), the controller 100 goes back to the processing in step S6.

Meanwhile, when the timing to start the execution of a calibration has come during execution of a print job, the general image forming apparatus described previously interrupts the active print job and executes the calibration. Therefore, the time from the start to finish of the print job (the job time) is extended, which decreases the productivity. In addition, if the job time is extended, the power consumption increases.

FIGS. 9A and 9B are diagrams showing examples of processing from the start to finish of a print job in a general image forming apparatus. FIG. 9A shows processing when a print job is normally executed. FIG. 9B shows processing when the timing to start the execution of a calibration has come during processing for creating printed material. As shown in FIG. 9B, when the timing to start the execution of a calibration has come during creation of the fifth sheet of printed material, the general image forming apparatus interrupts the print job after the creation of the fifth sheet of the printed material, executes the calibration, and creates the sixth sheet of the printed material after the completion of the calibration. As seen from FIGS. 9A and 9B, when a print job is interrupted and a calibration is then executed, the job time is extended.

If the calibration is executed, without interruption of the print job, after the finish of the print job (i.e., if the calibration is postponed), the job time can be prevented from being extended. However, the image quality of the printed material is not ensured and may be degraded.

Unlike the above general image forming apparatus, in the first embodiment, among a plurality of calibrations, a calibration capable of being completed within the interleaving paper insertion time LS is executed in parallel with the insertion of a necessary number of interleaving papers regardless of coming of the original timing to start the execution of the calibration. The image forming device 12 does not perform the image formation processing during the processing for inserting a necessary number of interleaving papers. Therefore, even when a calibration is executed in parallel with the insertion of the interleaving papers, the image formation processing is not interrupted and the print job is not affected.

When, in the above manner, a calibration is positively executed during a period when the print job is not affected, the possibility of coming of the timing to start the execution of the calibration during processing for creating printed material can be decreased. In other words, the possibility that the print job is interrupted by a calibration can be decreased.

Thus, it is possible to prevent the print job time from being extended by a calibration, which shortens the running time of the overall system and thus increases the productivity and reduces the power consumption. In addition, since a calibration is not postponed, printed material can be prevented from being degraded in image quality. Hence, while a degradation in image quality of printed material can be prevented, an increase in productivity and a reduction in power consumption can be achieved.

Although in the first embodiment the executor 102 starts, in time with the insertion start timing TS, the execution of a calibration capable of being completed within the interleaving paper insertion time LS, the present disclosure is not limited to this embodiment. In a second embodiment of the present disclosure, the executor 102 may start, in time with the insertion start timing TS, the execution of a calibration capable of being completed within a total time LS2 of the interleaving paper insertion time LS and a predetermined additional time α.

Figure 7:
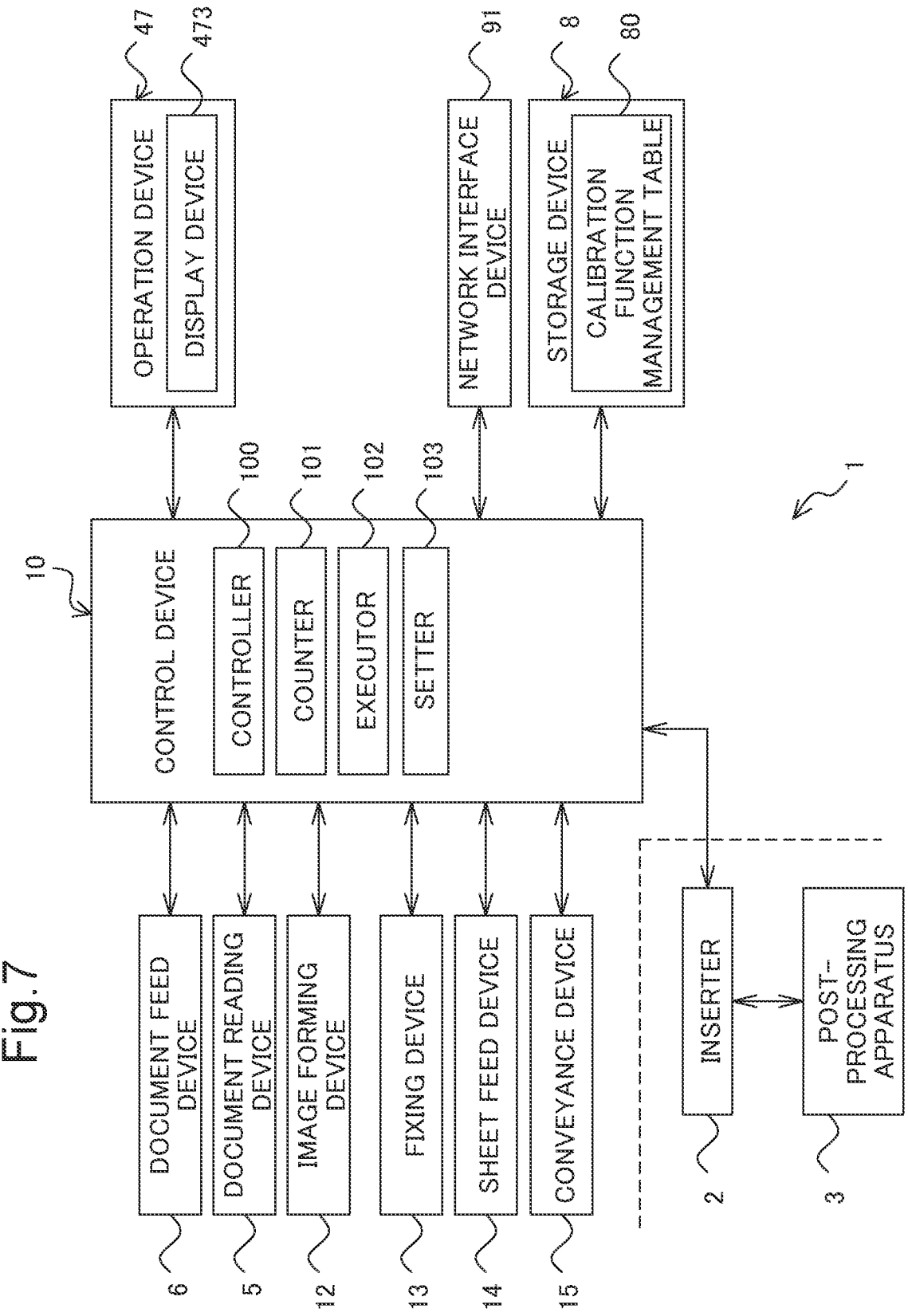
FIG. 7 is a functional block diagram showing an essential internal configuration of an image forming apparatus according to a second embodiment.

FIG. 7 is a functional block diagram showing an essential internal configuration of an image forming apparatus 1 according to a second embodiment. The image forming apparatus 1 according to the second embodiment is different from the image forming apparatus 1 according to the first embodiment shown in FIG. 2, in that the control device 10 functions as a setter 103. Hereinafter, explanation of the same structures and processing as those in the image forming apparatus 1 according to the first embodiment will be omitted.

The setter 103 selects a standard mode or a specific mode based on a user's instruction accepted by the operation device 47.

When the standard mode is selected, the executor 102 starts, in time with the insertion start timing TS, the execution of a calibration capable of being completed within the interleaving paper insertion time LS. On the other hand, when the specific mode is selected, the executor 102 starts, in time with the insertion start timing TS, the execution of a calibration capable of being completed within the total time LS2 of the interleaving paper insertion time LS and the additional time α.

Figure 8A:
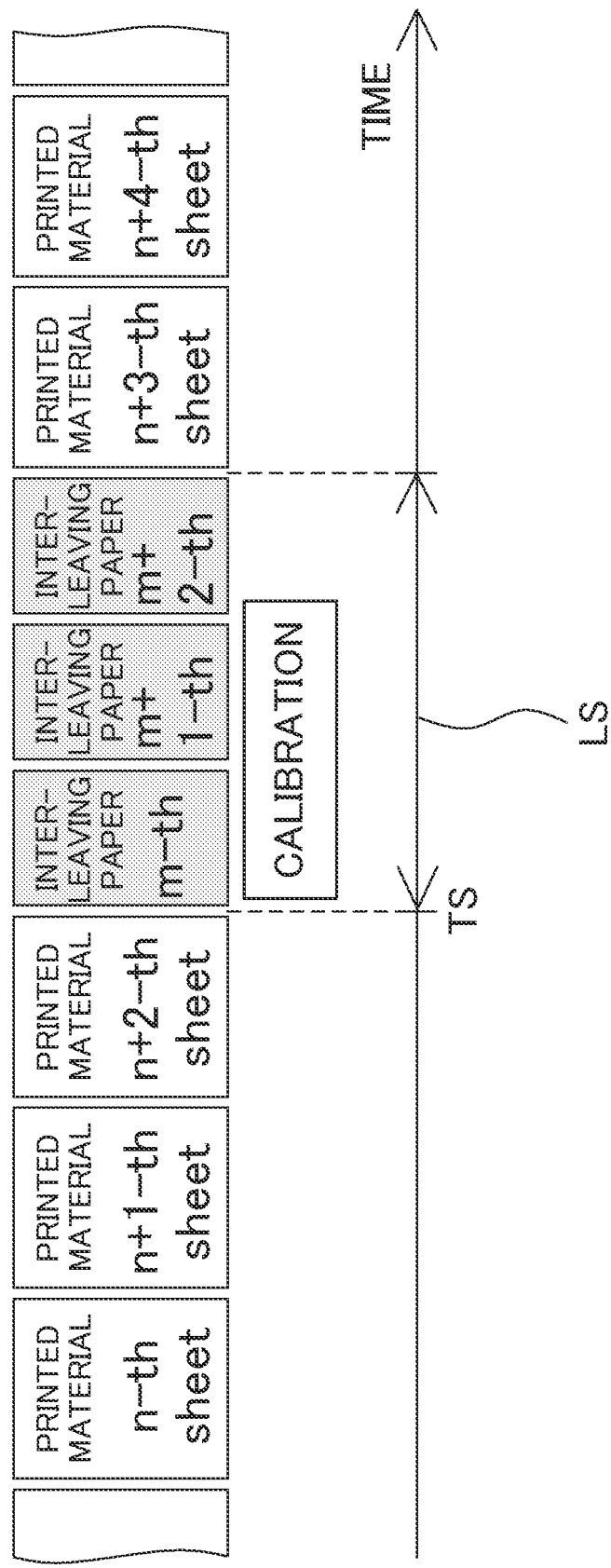
FIG. 8A is a diagram showing an example of processing where a calibration is executed in parallel with the insertion of interleaving papers while a standard mode is selected.
Figure 8B:
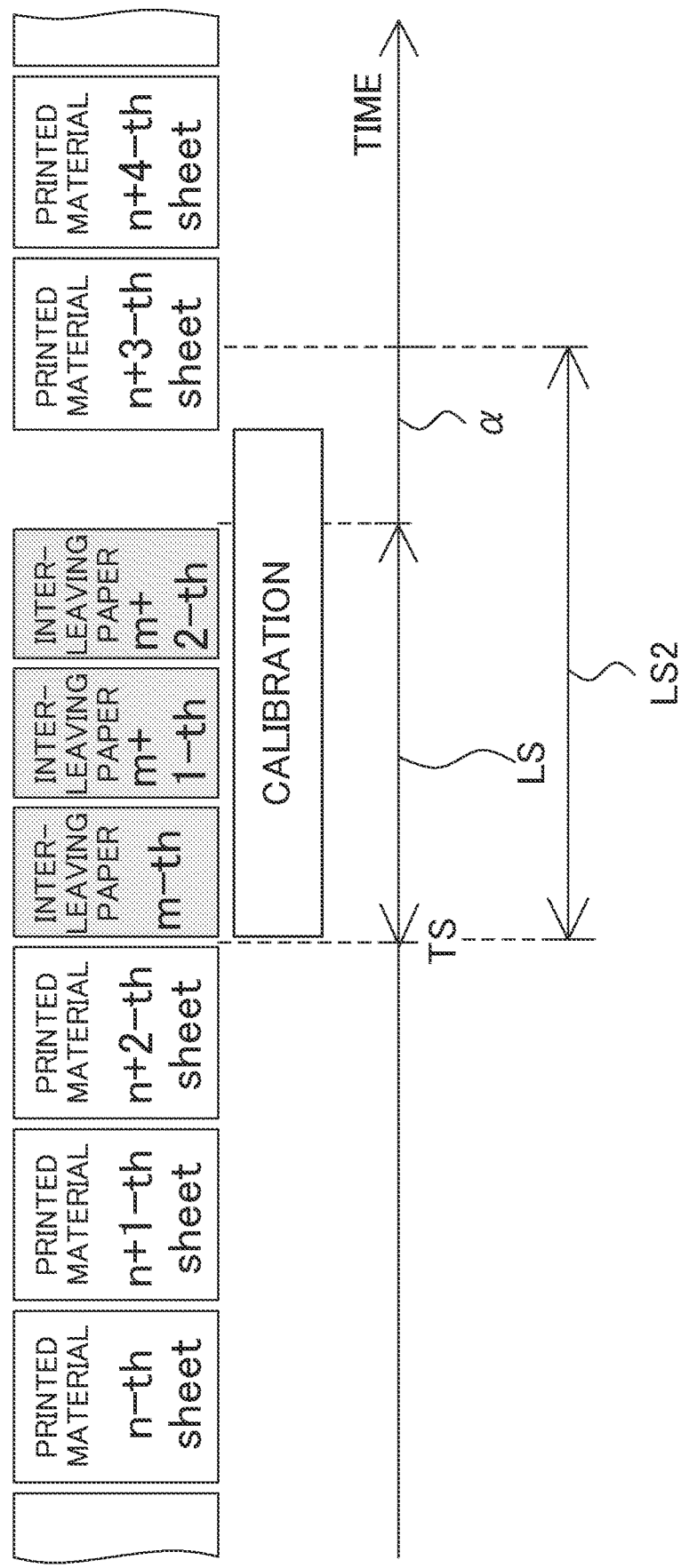
FIG. 8B is a diagram showing an example of processing where a calibration is executed in parallel with the insertion of interleaving papers while a specific mode is selected.

FIG. 8A is a diagram showing an example of processing where a calibration is executed in parallel with the insertion of interleaving papers while the standard mode is selected. FIG. 8B is a diagram showing an example of processing where a calibration is executed in parallel with the insertion of interleaving papers while the specific mode is selected.

As shown in FIG. 8B, when the specific mode is selected, the executor 102 executes even a calibration incapable of being completed within the interleaving paper insertion time LS, in parallel with the insertion of interleaving papers.

In the second embodiment, when the specific mode is selected, a print job may be interrupted as shown in FIG. 8B. However, the time of interruption is short and, therefore, the running time of the overall system can be reduced.

The operation device 47 may accept a user's selection of the additional time α. For example, when the user's selection is Level 1, the executor 102 may treat the additional time α as "one second". When the user's selection is Level 2, the executor 102 may treat the additional time α as "two seconds". In this manner, the executor 102 may increase the additional time α according to the level. Thus, the user can increase the convenience as necessary.

The present disclosure is not limited to the above embodiments and can be modified in various ways. The structures, configurations, and processing of the embodiments described with reference to FIGS. 1 to 8B are merely illustrative and are not intended to limit the present disclosure to them. For example, although in the above embodiments a multifunction peripheral is used as an example of the image forming apparatus defined in CLAIMS, the image forming apparatus is not limited to the multifunction peripheral and may be other electronic equipment having a print function.

While the present disclosure has been described in detail with reference to the embodiments thereof, it would be apparent to those skilled in the art the various changes and modifications may be made therein within the scope defined by the appended claims.

What is claimed is:

1. An image formation system comprising:
    an image forming apparatus comprising an image forming device that forms an image on a printing sheet to create printed material and a conveyance device that conveys the printing sheet; and
    an inserter that inserts an interleaving paper between sheets of the printed material in a manner to supply the interleaving paper downstream of the image forming device in a direction of conveyance of the printing sheet,
    the image forming apparatus further comprising a control device that includes a processor and functions, through the processor executing a control program, as:
    a controller that performs control for allowing the image forming device to execute a print job and allowing the inserter to insert the interleaving paper between sheets of the printed material at an insertion start timing specified by the print job;
    an executor that executes each individual one of a plurality of calibrations for purpose of retaining and controlling an image quality of the printed material; and
    a counter that counts, for each of the plurality of calibrations, a count value of a predetermined item,
    wherein when the plurality of calibrations include a first calibration in which the count value has reached a predetermined target value, the executor determines that a timing to start execution of the first calibration has come and executes the first calibration, and
    wherein when the plurality of calibrations include a second calibration capable of being completed within an interleaving paper insertion time required to insert the interleaving paper or a third calibration capable of being completed within a total time of the interleaving paper insertion time and a predetermined additional time, the executor executes the second calibration or the third calibration in time with the insertion start timing.

2. The image formation system according to claim 1, further comprising an operation device that accepts an instruction based on an operation of a user,
    wherein the control device further functions as a setter that, based on the instruction accepted by the operation device, sets a standard mode or a specific mode,
    when the standard mode is set, the executor starts execution of the second calibration in time with the insertion start timing, and
    when the specific mode is set, the executor starts execution of the third calibration in time with the insertion start timing.

3. The image formation system according to claim 1, wherein
    while the image forming device creates a plurality of copies of the printed material and after the image forming device creates a first copy of the printed material, the executor starts the execution of the second calibration or the third calibration in time with the insertion start timing, and
    while the image forming device creates the first copy of the printed material, the executor acquires information on the interleaving paper from information indicated by the print job and determines, based on the acquired information, whether or not the plurality of calibrations include the second calibration or the third calibration.

4. The image formation system according to claim 3, wherein the executor acquires, as the information on the interleaving paper, number-of-sheets information on a necessary number of interleaving papers to be inserted in a single round of insertion processing, calculates the interleaving paper insertion time based on the acquired number-of-sheets information, and determines, using the calculated interleaving paper insertion time, whether or not the plurality of calibrations include the second calibration or the third calibration.

5. The image formation system according to claim 1, wherein the executor executes, as the plurality of calibrations, each individual one of a density calibration for controlling the image density of the printed material, a color shade calibration for controlling the color shade of the image of the printed material, and a location calibration for controlling the color location of the printed material.

6. The image formation system according to claim 1, wherein the counter counts as the count value at least one of an elapsed time since a time of execution of a previous calibration and a number of printed sheets after the previous calibration.

* * * * *